(12) United States Patent
Rokusek et al.

(10) Patent No.: US 7,523,035 B2
(45) Date of Patent: Apr. 21, 2009

(54) HANDS-FREE CIRCUIT AND METHOD FOR COMMUNICATING WITH A WIRELESS DEVICE

(75) Inventors: Daniel Rokusek, Long Grove, IL (US); Raghunandan Sanjeev, Palatine, IL (US); Kranti Kambhampati, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 727 days.

(21) Appl. No.: 10/900,772

(22) Filed: Jul. 26, 2004

(65) Prior Publication Data

US 2006/0019713 A1    Jan. 26, 2006

(51) Int. Cl.
*G10L 13/00* (2006.01)
*H04M 1/00* (2006.01)
*H04M 1/56* (2006.01)
*H04M 11/00* (2006.01)
*H04B 7/00* (2006.01)

(52) U.S. Cl. ............ 704/260; 704/258; 455/569.1; 455/567; 455/41.2; 379/142.06; 379/88.16

(58) Field of Classification Search ............ None
See application file for complete search history.

(56) References Cited

U.S. PATENT DOCUMENTS

| | | | |
|---|---|---|---|
| 5,268,834 A | | 12/1993 | Sanner et al. |
| 6,108,630 A | * | 8/2000 | Kuechler et al. ............ 704/270 |
| 6,195,430 B1 | | 2/2001 | Eriksson et al. |
| 6,226,367 B1 | * | 5/2001 | Smith et al. ............ 379/142.04 |
| 6,415,029 B1 | | 7/2002 | Piket et al. |
| 6,532,454 B1 | | 3/2003 | Werbos |
| 6,745,054 B2 | * | 6/2004 | Fraccaroli ............ 455/567 |
| 6,940,954 B1 | * | 9/2005 | Toebes ............ 379/88.17 |
| 7,164,760 B2 | * | 1/2007 | Krause ............ 379/142.06 |
| 7,233,658 B2 | * | 6/2007 | Koser et al. ............ 379/373.01 |
| 2005/0267756 A1 | * | 12/2005 | Schultz et al. ............ 704/258 |

OTHER PUBLICATIONS

Ulery, K. et al. "Hands-Free Profile Adopted Version 1.0" Bluetooth SIG Car Working Group Apr. 29, 2003.*

* cited by examiner

*Primary Examiner*—David R Hudspeth
*Assistant Examiner*—Matthew J Sked
(74) *Attorney, Agent, or Firm*—Vedder Price P.C.

(57) ABSTRACT

A hands-free circuit (10) and method produces audio information (90) corresponding to voice tag information (60) stored either in the hands-free circuit (10) or in a wireless device (320). The hands-free circuit includes a wireless local area network (WLAN) transceiver (20), memory (40) and a speech processor (30). For example, the wireless local area network transceiver (20) may be a Bluetooth transceiver that communicates with the wireless device (320) and receives wireless device information (80). The wireless device information (80) may represent caller identification information, call processing information relating to the status of a call, phone status information or any suitable information. The speech processor (30) produces audio information (90) corresponding to the voice tag information (60). According to one embodiment, the speech processor (30) produces speech synthesized wireless device information (80), in-band ring tone information or any suitable information.

21 Claims, 5 Drawing Sheets

HANDS-FREE CIRCUIT AND METHOD FOR COMMUNICATING WITH A WIRELESS DEVICE

FIELD OF THE INVENTION

The invention relates generally to communication systems and more particularly to hands-free circuits and methods.

BACKGROUND OF THE INVENTION

As the use of wireless communication devices continues to proliferate, safety issues arrive. In particular, the use of wireless devices while driving a vehicle raises safety issues. As a result, many jurisdictions now mandate the use of hands-free wireless devices while driving.

Hands-free circuits may be employed in wireless devices, such as personal data assistants (PDAs), cellular phones, two-way radios, car kits for cellular telephones, car phones for use in airplanes, and other suitable devices that can move throughout a geographic area. Additionally, hands-free circuits may be employed in wireline devices, such as desk phones, hands-free speaker phones, pay phones, kiosk phones, video and audio conference phones and telephones otherwise commonly referred to in the telecommunications industry as plain old telephone system (POTS) devices. Hands-free speaker phones typically include a microphone to produce the uplink signal, a speaker to acoustically produce the downlink signal, an echo canceler to cancel the echo signal and a telephone circuit.

The hands-free speaker phone may be fully or partially integrated into an in-vehicle audio system to wirelessly communicate with a wireless device. The vehicle may be any suitable vehicle, such as an automobile, truck, boat or airplane. The in-vehicle audio system may include an amplifier, speakers and an audio source, such as a tuner circuit, a CD/DVD player, a tape player, a hard drive playback system, a satellite radio, etc. The in-vehicle audio system may communicate with a wireless device via a communication apparatus in the vehicle. For example, the communication apparatus may be installed into a vehicle by mounting and wiring the communication apparatus, a microphone, a speaker and a display in the vehicle. Alternatively, the communication apparatus may be suitably self-contained and simply plug into a vehicle cigarette lighter.

In a hands-free circuit, a near end user transmits an uplink signal to a far end user via the microphone. Conversely, the near end user receives a downlink signal from the far end user. Typically, the downlink audio signal received from the far end through the downlink path is played through at least one speaker either integrated in the communication apparatus or installed in the in-vehicle audio system. As previously stated, however, operating the hands-free speaker phone installed in the vehicle may distract the user, especially while driving.

According to one method, a display shows wireless device status information, such as caller identification information. However, such a display may be distracting to the driver of the vehicle. As a result, a display on a hands-free device used in a vehicle is undesirable. According to another method, the hands-free device installed in a vehicle provides a single speech message when communication is not possible with the wireless device regardless of the type of communication problem. However, such a device plays only a single message regardless of the type of communication problem and therefore does not play a speech message corresponding with wireless device status information.

BRIEF DESCRIPTION OF THE DRAWINGS

The present invention is illustrated, by way of example and not limitation, in the accompanying figures, in which like reference numerals indicate similar elements, and in which.

DETAILED DESCRIPTION OF THE PREFERRED EMBODIMENTS

A hands-free circuit and method produces audio information corresponding to voice tag information stored either in the hands-free circuit or in a wireless device. The hands-free circuit includes a wireless local area network (WLAN) transceiver, memory and a speech processor. For example, the wireless local area network transceiver may be a Bluetooth transceiver that communicates with the wireless device and receives wireless device information. The wireless device information may represent caller identification information, call processing information relating to the status of a call, phone status information or any suitable information. The speech processor produces audio information corresponding to the voice tag information. According to one embodiment, the speech processor produces speech synthesized wireless device information, in-band ring tone information or any suitable information.

The memory includes voice tag information associated with stored wireless device information. The speech processor receives the voice tag information associated with the stored wireless device information when the received wireless device information corresponds with the stored wireless device information contained in the memory. For example, in response to receiving the voice tag information, the speech processor produces audio information corresponding to the voice tag information. However, when the received wireless device information does not correspond with the stored wireless device information contained in the memory, the speech processor speech synthesizes the received wireless device information to produce the audio information.

Among other advantages, a user may control a wireless device via the hands-free circuit 10 through the use of audio prompts, audio information and commands in response to synthesized speech or other suitable audio and voice commands. The ability to control the wireless device and to permit the user to receive and make a call and carry on a conversation audibly results in many benefits, especially while the user, for example, is driving in a vehicle. For example, the hands-free circuit 10 allows the user to audibly control the wireless device through voice prompt and voice commands so that the user is not required to view a distracting display. As a result, a user of the hands-free circuit 10 may concentrate on other activities such as driving by allowing the user to keep the user's eyes on the road. Since the hands-free circuit 10 allows the user to audibly control many or all functions of a wireless device through the use of voice prompts and voice commands, the hands-free circuit 10 is safer and easier to use while driving in a vehicle. Further, the hands-free circuit 10 provides better sound to the user because the hands-free circuit 10 may include, for example, a high quality speaker, or, alternatively, may play audio through the high quality audio system of the vehicle. According to one embodiment, the hands-free circuit 10 allows the user to personalize the hands-free circuit 10 with the user's personal information, such as a phone book in the wireless device. Accordingly, the hands-free circuit 10 may be synchronized with information on the wireless device so that information regarding the phone book or other personal settings in the wireless device may be transferred or programmed onto the hands-free circuit 10. Further, if the hands-free circuit 10 does not contain information, such as phone book information, corresponding to received Caller ID information, the hands-free circuit may obtain voice tag information from the wireless device if it is available.

Figure 1:
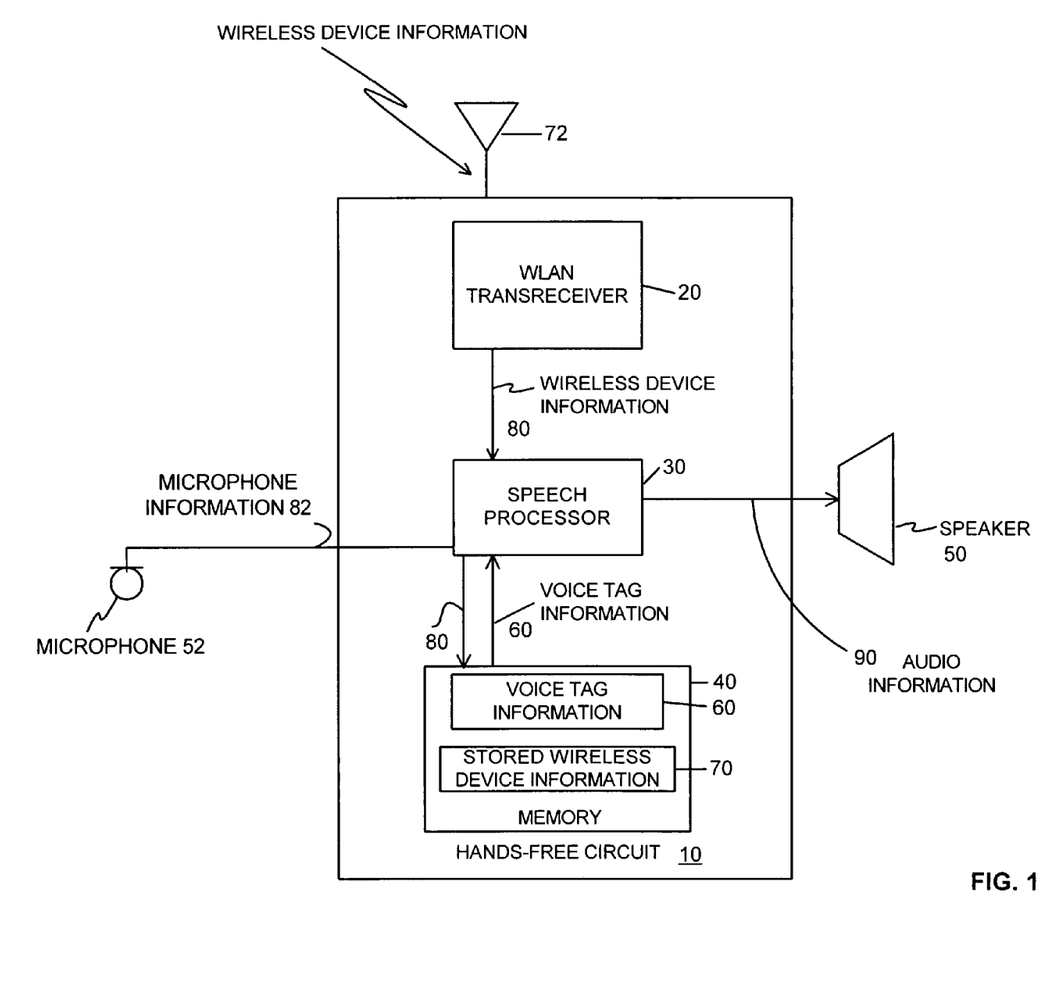
FIG. 1 is a block diagram illustrating one example of a hands-free circuit according to one embodiment of the invention.

FIG. 1 is a block diagram of a hands-free circuit 10 for allowing a user to audibly communicate with and control a device, such as a wireless device, via audio commands and audio prompts. The hands-free circuit 10 includes a wireless local area network transceiver 20, a speech processor 30 and a memory 40. The hands-free circuit 10 may further include a speaker 50 and a microphone 52, either of which may be integrated into the hands-free circuit 10 or may be remotely located. The memory includes voice tag information 60 and stored wireless device information 70. The hands-free circuit 10 is coupled to a WLAN (Wireless Local Area Network) antenna 72, which may also be integrated into the hands-free circuit 10 or may be remotely located. The various links of FIG. 1 may be any suitable mechanism for conveying electrical signals or data as appropriate.

The speech processor 30 may be one or more suitably programmed processors, such as a microprocessor, a microcontroller or a digital signal processor (DSP), and therefore includes associated memory, such as memory 40, that contains executable instructions that, when executed, cause the speech processor 30 to carry out the operations described herein. In addition, the speech processor 30, as used herein, may include discrete logic state machines or any other suitable combination of hardware, software, middleware and/or firmware.

The memory 40 may be, for example, random access memory (RAM), read only memory (ROM), optical memory or any other suitable storage medium located locally or remotely such as via a server. Additionally, the memory may be accessible by a wireless wide area network (WWAN), a wide access network (WAN), a local area network (LAN), a personal area network (PAN), a wireless local area network, an IEEE 802.11 wireless network, a Bluetooth network or any suitable communication interface or network.

The wireless local area network transceiver 20 may be a Bluetooth-compliant device or a wireless fidelity device (WiFi, i.e., a device based on the IEEE 802.11 specification) or any suitable communication device. The WLAN transceiver 20 may interface with a wireless device via a WLAN air interface.

Figure 2:
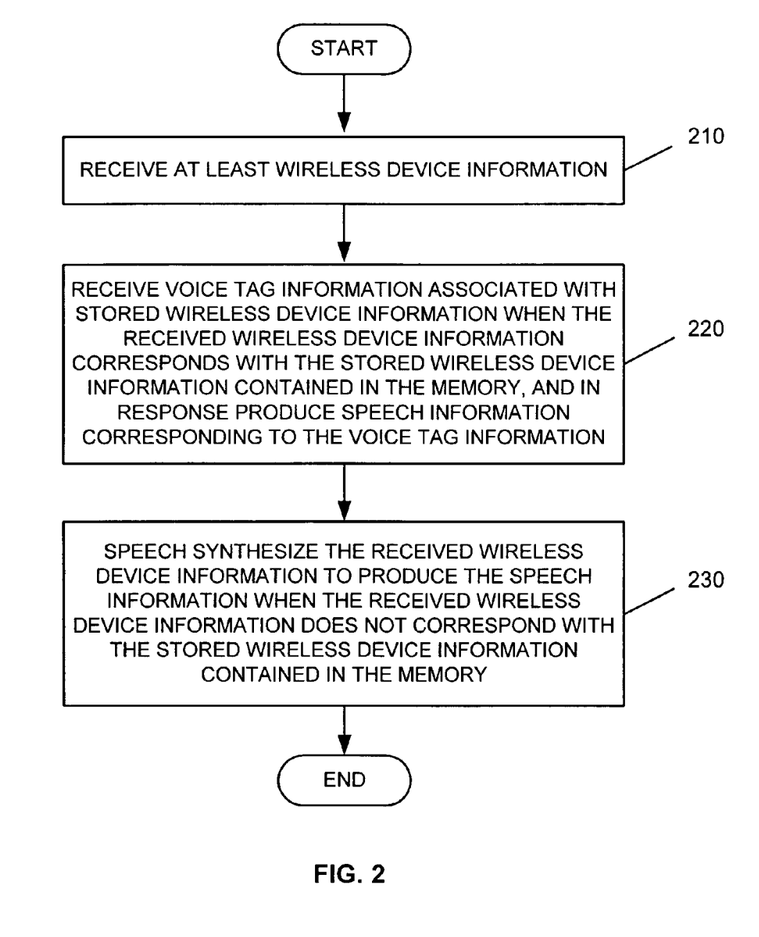
FIG. 2 is a flowchart illustrating one example of a method in a hands-free circuit according to one embodiment of the invention.

FIG. 2 is a flowchart illustrating one example of a method in a hands-free circuit according to one embodiment of the invention. The method may be carried out by the hands-free circuit 10. However, any other suitable structure may be used. It will be recognized that the method, beginning with step 210, will be described as a series of operations, but the operations may be performed in any suitable order and may be repeated in any suitable combination.

As shown in step 210, the wireless local area network transceiver 20 receives at least wireless device information 80. The wireless device information 80 may include, for example, caller identification information (CID), call processing information, in-band ring tone information, speech information, three-way calling information, voice mail information, navigation information, wireless device status information or any other suitable information. The wireless device status information may also include, for example, link quality information and battery level information or any information associated with the wireless device or wireless system. For example, the voice mail information may provide an alert to a new message. The link quality information may indicate that there is service, no service, or poor service in order to let the user know if the user can make a call or receive a call. Further, the link quality information may indicate the status or existence of a WLAN interface for communication with the wireless device as well as a WWAN interface for communication between the wireless device and a wireless infrastructure system. The wireless device information 80 may also include PTT (Push To Talk) information in order to facilitate Push To Talk features in the wireless device, as is known in the art. Additionally, the wireless device information 80 may provide DTMF (Dual Tone Multi Frequency) information, hands-free and privacy mode indications as well in any other suitable features or indications. For example, the hands free circuit 10 may allow the user to switch from a hands-free mode where the audio information 90 is acoustically produced by a speaker 50 or the user may activate a privacy mode where the audio information 90 is acoustically produced by a headset. Alternatively the hands-free circuit is deactivated or at least the speaker 50 is deactivated such that the user may communicate directly with the wireless device in the privacy mode.

As shown in step 220, the speech processor 30 receives the voice tag information 60 associated with the stored wireless device information 70 when the received wireless device information 80 corresponds with the stored wireless device information 70 contained in the memory 40. In response, the speech processor 30 produces audio information 90 corresponding to the voice tag information 60.

The voice tag information 60 may represent stored audio files corresponding to the status of the wireless device or information related to call processing. For example, the voice tag information 60 may include an audio file that when played produces an audio representation of caller identification information associated with the voice tag. For example, when the speech processor 30 receives the caller identification information as wireless device information 80, the speech processor receives the voice tag information 60 associated with the received wireless device information 80 stored in memory 40. The memory 40 may therefore be programmed with caller identification information, for example, that is associated with or linked with the stored wireless data information 70. According to this example, a user may program a telephone number as stored wireless device information 70 along with the voice tag information 60 by speaking into the microphone 52 to produce microphone information 82. The speech processor 30, in response to receiving the microphone information 82, may record the voice tag information 60 into memory 40 as quantitized PCM audio and then encode it using a vocoder as is known in the art. During playback, the speech processor 30 decodes the voice tag information 60 stored in the memory 40 and plays back the PCM audio as the audio information 90.

As shown in step 230, the speech processor 30 speech synthesizes the received wireless device information 80 to produce the audio information 90 when the received wireless device information 80 does not correspond with the stored wireless device information 70 contained in the memory 40. For example, the speech processor 30 may receive the stored wireless device information 70 representing, for example, caller identification information. In response to receiving the wireless device information 80, the speech processor 30 may synthesize the digits of the caller identification information. For example, the digits may be associated with voice tag information 60 stored in memory 40. Alternatively, the digits may be synthesized using known speech synthesis techniques.

Figure 3:
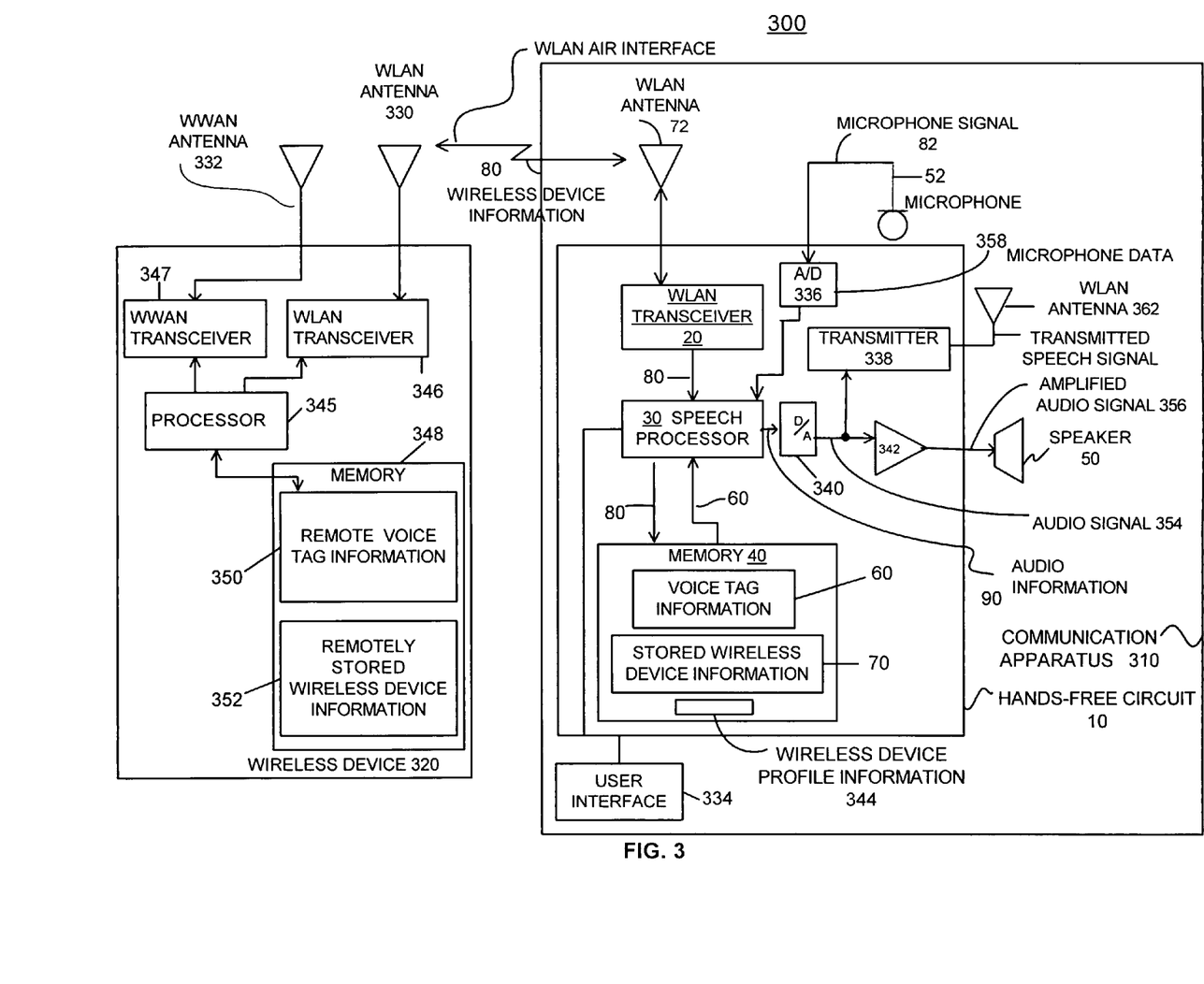
FIG. 3 is a block diagram illustrating an example of a communication system circuit according to another embodiment of the invention.

FIG. 3 is a block diagram illustrating an example of a communication system circuit 300 according to another embodiment of the invention. The communication system circuit 300 includes a communication apparatus 310, a wireless device 320, a WLAN antenna 330 and a WWAN antenna 332. According to one embodiment, the communication apparatus 310 includes a user interface 334. For example, the user interface 334 may represent one or more switches or buttons in order to allow the user to cause the hands-free circuit 10 to switch between a hands-free and a privacy mode. Further, the user interface 334 may include a keypad in order to permit push-button entry of information. According to another embodiment, the user interface includes a display and/or one or more lights (i.e. lamp or light emitting diode. The hands-free circuit further includes an A/D converter 336, a transmitter 338, a D/A converter 340, and an amplifier 342.

The interface between the WLAN antenna 330 coupled to the wireless device 320 and the WLAN antenna 72 included in the communication apparatus 310 is a WLAN air interface 360. The WLAN air interface 360 may be a Bluetooth-compliant interface or a wireless fidelity interface (WiFi, i.e., a device based on the IEEE 802.11 specification) or any suitable air interface.

The wireless device 320 includes a processor 345, a WLAN transceiver 346, a WLAN transceiver 347 and memory 348. The memory 348 includes remote wireless device voice tag information 350 and remotely stored wireless device information 352. The wireless device 320 may be a cellular phone, a personal digital assistant (PDA) equipped with a WWAN interface or a portable computer also equipped with a WWAN interface.

Wireless device 320 may communicate with a wireless wide area network (WWAN) such as a cellular telephone system suitable for communicating with a public switching telephone network (PSTN) (not shown) via the WWAN antenna 332 and the WWAN transceiver 347. For example, the WWAN transceiver 347 may communicate with a cellular telephone system according to any known or future wireless standard, such as, for example, code division multiple access (CDMA), time division multiple access (TDMA), advanced mobile phone standard (AMPS) or group special mobile (GSM), including any current and future protocols such as the third generation (3G) and higher wireless communication protocols.

The memory 40 further includes wireless device profile information 344. The wireless device profile information 344 provides a profile of the wireless device 320 to indicate that the wireless device 320 includes remote voice tag information 350 associated with the remotely stored wireless device information 352. For example, the wireless device profile information 344 may be compatible with or based on profile information defined in the Bluetooth specification, as is known in the art. However, the wireless device profile information 344 may be similarly based on or derived from the IEEE 802.11 standard or any other communication interface or protocol either currently available or developed in the future.

According to one embodiment, the speech processor 30 receives the remote voice tag information 350 as the received wireless device information 80 when the received wireless device information 80 does not correspond with the stored wireless device information 70 contained in the memory 40 and when the wireless device profile information 70 and the memory 40 indicate that the wireless device 320 includes the remotely stored wireless device information 352 corresponding to the received wireless device information 80. For example, if the received wireless device information 80 represents caller identification information that does not correspond with the stored wireless device information 70, then the speech processor 30 determines if the wireless device profile information 344 indicates that the wireless device 320 contains remote voice tag information 350 associated with the received caller identification information.

If the wireless device 320 does contain the remote voice tag information 350 corresponding to the received wireless device information 80, then the speech processor 30 requests and receives the remote voice tag information 350. In response to receiving the remote voice tag information 350, the speech processor 30 produces the audio information 90 corresponding to the received remotely stored voice tag information 350.

The digital-to-analog converter 340 receives the audio information 90 and in response produces a audio signal 354. The amplifier 342 receives the audio signal 354 and in response produces an amplified audio signal 356. The analog-to-digital converter 336 receives the microphone signal 82 and in response produces microphone data 358.

The communication apparatus 310 according to one embodiment includes a housing containing the hands-free circuit 10, the WLAN antenna 72, the microphone 52, the speaker 50 and the optional user interface 334. Additional or fewer components may be included in the communication apparatus 310 other than those described above. As is known in the art, the speech processor 30, the WLAN transceiver 20, the memory 40, the A/D converter 336, the transmitter 338, the D/A converter 340 and the amplifier 342 may be integrated into a single circuit board or alternatively may be manufactured as one or more separate circuit boards or integrated circuit chips from one or more manufacturers. The circuit boards may be interconnected as required through the use of a motherboard, a flat or nonflat flexible multiconductor cable, a multiconductor wire cable or any suitable type of interconnection mechanism. Each circuit board may be attached or coupled either directly or indirectly or to other circuit boards via a suitable fastening device, as is known in the art, such as a connector, a clamp, a clip, a screw or a nut and a bolt. The integrated circuit chips may be interconnected as required via a circuit board, a multicircuit chip carrier, a flat flexible multiconductor cable, a multiconductor wired cable or any suitable type of interconnection device. The circuit boards and integrated circuit chips may be mounted using chemical bonding, such as an adhesive or any suitable fastening device.

Figure 4:
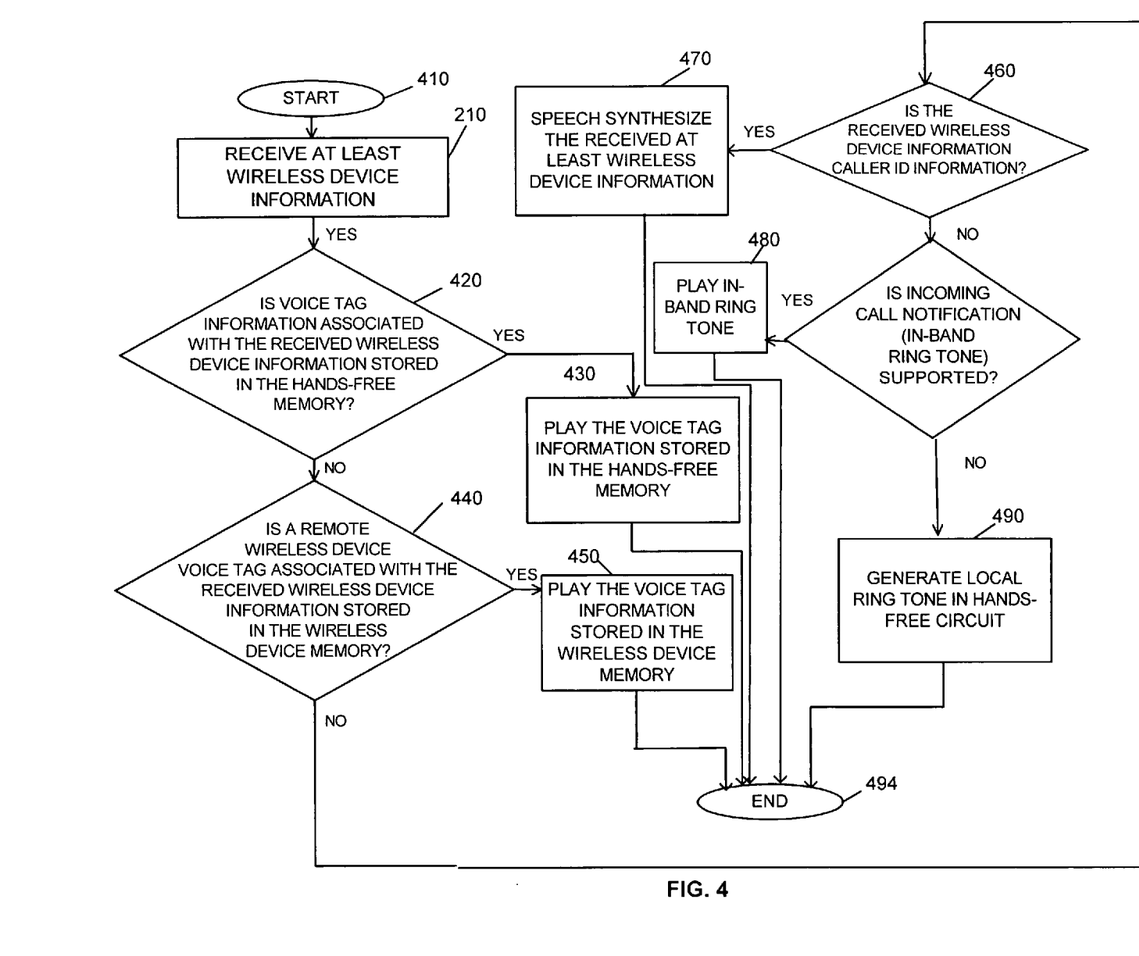
FIG. 4 is a flowchart illustrating another example of a method in an in-vehicle communication system according to one embodiment of the invention.

FIG. 4 illustrates a method in an in-vehicle communication system according to one embodiment of the invention. The method may be carried out by the communication apparatus 310 as described with respect to FIG. 3 and the hands-free circuit with respect to FIG. 1. However, any other suitable structure may also be used. It will be recognized that the method, beginning with step 410, will be described as a series of operations, but the operations may be performed in any suitable order and may be repeated in any suitable combination. Further, although the method ends with step 494, the method may loop back to step 410 or to any other suitable step.

As shown in step 420, the speech synthesizer 30 determines if the received wireless device information 80 corresponds with the stored wireless device information 70 contained in the memory 40. For example, the speech synthesizer 30 may compare the received wireless device information 80 with stored wireless device information 70 to determine if a match exists.

As shown in step 430, if the received wireless device information 80 corresponds with the stored wireless device information 70, then the speech synthesizer 30 receives the voice tag information 60 stored in memory 40 associated with the stored wireless device information 70 and in response produces the audio information 90 corresponding to the voice tag information 60.

As shown in step 440, if the received wireless device information 80 does not correspond with the stored wireless device information 70, then the speech processor 30 determines if the wireless device profile information 344 in the memory 40 indicates that the wireless device 320 includes the remotely stored wireless device information 352 corresponding to the received wireless device information 80.

As shown in step 450, if the wireless device profile information 344 indicates that the wireless device 320 includes the remotely stored device information 352, then speech processor 30 receives the remote voice tag information 350 as the received wireless device information 80 and in response produces the audio information 90 corresponding to the remote voice tag information 350.

As shown in step 460, if the wireless device profile information 344 does not indicate that the wireless device 320 includes the remotely stored wireless device information corresponding to the received wireless device information 80, then the speech processor 30 determines if the received wireless device information 80 represents data that may be speech synthesized, such as caller identification information or wireless device status information or any other suitable information.

As shown in step 470, if the received wireless device information 80 represents data that may be speech synthesized, then the speech processor 30 synthesizes the received wireless device information 80 to produce the audio information 90 when the received wireless device information 80 does not correspond with the stored wireless device information 70 contained in the memory 40. The speech processor 30 may determine if the incoming wireless device information 80 corresponds to in-band ring tone information by decoding at least a portion of the wireless device information 80 to be identified as in-band ring tone information. Other suitable methods may be employed for determining or detecting in-band ring tone information within the wireless device information 80, as is known in the art.

As shown in step 480, if the speech processor 30 determines if the incoming wireless device information corresponds to in-band ring tone information, then the speech processor 30 produces in-band ring tone information as the audio information 90. For example, the in-band ring tone information may correspond to quantized data corresponding to a ring tone for playback as is known in the art.

As shown in step 490, however, if the speech processor 30 determines that the incoming wireless device information does not correspond to in-band ring tone information, then the speech processor 30 produces local ring tone information as the audio information 90. For example, the local ring tone information may be user defined or a default local ring tone may be produced. The local ring tone may be stored as quantitized audio data in an audio file. Alternatively, the local ring tone may be produced by a ringer, a buzzer, or a tone generator or any suitable device may produce a suitable local ring tone.

Figure 5:
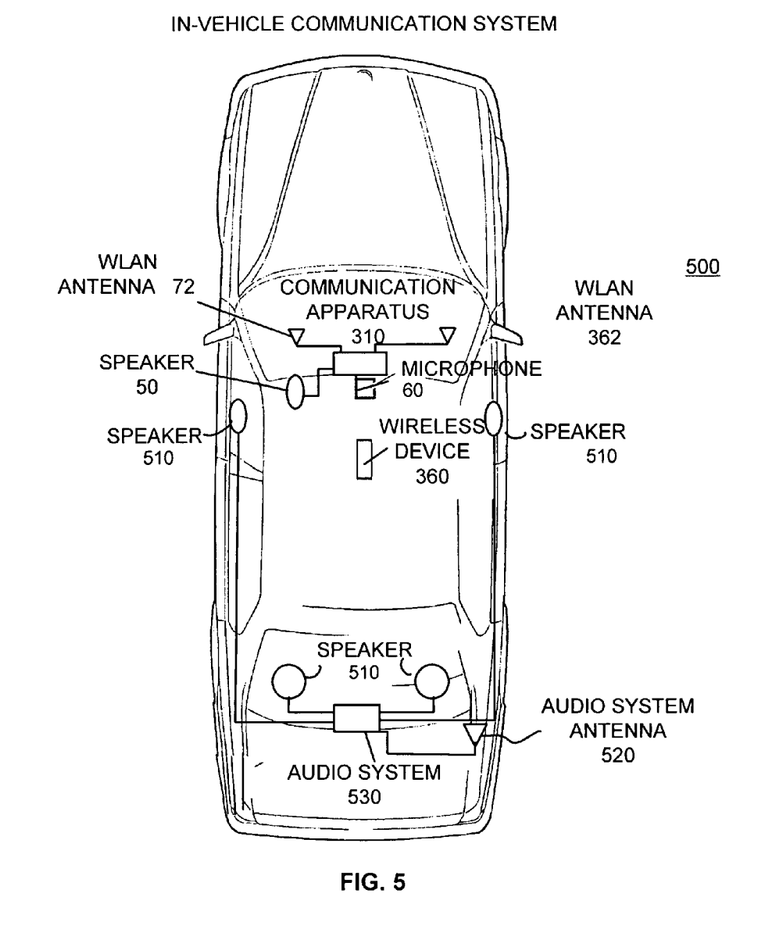
FIG. 5 is a block diagram of an in-vehicle communication system according to one exemplary embodiment of the invention.

FIG. 5 is a block diagram of an in-vehicle communication system 500 according to at least one embodiment of the invention. The in-vehicle indication system 500 includes the communication apparatus 310, the wireless device 320, at least one speaker 510, an audio system antenna 520 and an audio system 530.

For example, the communication apparatus 310 may communicate with the wireless device 320 via the WLAN air interface 360, such as a Bluetooth interface or WiFi interface as previously discussed. Alternatively, the communication apparatus 310 may interface with the wireless device 320 through a hard wire connection via a wireless device cradle. According to one embodiment, the communication apparatus 310 further includes the transmitter 338 for providing the audio signal 354 or the audio information 90 to the audio system 530 via the WLAN antenna 362 and the audio system antenna 520. For instance, the transmitter 338 may be another Bluetooth transceiver or alternatively, an RF modulator suitable for transmitting in the FM (Frequency Modulated) band as is commonly known in the art.

Audio system 530 includes a playback system and an amplifier and any other suitable components. The playback system further may include a tuner circuit, a tape player and a CD/DVD player or any suitable device for producing a playback audio signal, as is known in the art. The amplifier internal to the audio system 530 may then provide an audio signal to at least one speaker 510 to acoustically transmit the audio signal 354. In this configuration, the user may listen to the audio signal 354 over a high quality audio system, as opposed to a single speaker that may not be optimally mounted and/or located within the vehicle.

The communication apparatus 310 may be mounted in any suitable location within the vehicle. For example, although the audio system 530 is shown in the trunk area of the vehicle and the communication apparatus 310 is shown near the dashboard of the vehicle, the communication apparatus 310 and/or the audio system 530 may be located in any suitable location, including inside the dashboard, under the dashboard, integrated within a radio within the dashboard, or, the trunk area of the vehicle or any suitable location.

Among other advantages, a user may control the wireless device 320 via the hands-free circuit 10 through the use of audio prompts, the audio information 90 and commands in response to synthesized speech or other suitable audio and voice commands. The ability to control the wireless device 320 and to permit the user to receive and make a call and carry on a conversation audibly results in many benefits, especially while the user, for example, is driving in a vehicle. For example, the hands-free circuit 10 allows the user to audibly control the wireless device 320 through voice prompt and voice commands so that the user is not required to view a distracting display. As a result, a user of the hands-free circuit 10 may concentrate on other activities such as driving by allowing the user to keep the user's eyes on the road. Since the hands-free circuit 10 allows the user to audibly control many or all functions of a wireless device 320 through the use of voice prompts and voice commands, the hands-free circuit 10 is safer and easier to use while driving in a vehicle. Further, the hands-free circuit 10 provides better sound to the user because the hands-free circuit 10 may include, for example, a high quality speaker 50, 510, or, alternatively, may play audio through the high quality audio system 530 of the vehicle.

According to one embodiment, the hands-free circuit 10 allows the user to personalize the hands-free circuit 10 with the user's personal information, such as a phone book in the wireless device 320. Accordingly, the hands-free circuit 10 may be synchronized with information on the wireless device 320 so that information regarding the phone book or other personal settings in the wireless device may be transferred or programmed onto the hands-free circuit 10. Further, if the hands-free circuit 10 does not contain information, such as phone book information, corresponding to received Caller ID information, the hands-free circuit 10 may obtain voice tag information from the wireless device 320 if it is available.

It is understood that the implementation of other variations and modifications of the invention and its various aspects will be apparent to those of ordinary skill in the art and that the invention is not limited by the specific embodiments described. It is therefore contemplated to cover by the present invention any modifications, variations or equivalents that fall within the spirit and scope of the basic underlying principles disclosed and claimed herein.

What is claimed is:

1. A hands-free circuit for communicating with a wireless device, comprising:
   a wireless local area network (WLAN) transceiver that receives at least wireless device information form the wireless device;
   memory including voice tag information associated with stored wireless device information;
   a speech processor, operatively coupled to the wireless local area network transceiver and to the memory, and operative to:
   receive the voice tag information associated with the stored wireless device information and in response produce audio information corresponding to the voice tag information when the received wireless device information corresponds with the stored wireless device information contained in the memory; and
   speech synthesize the received wireless device information to produce the audio information when the received wireless device information does not correspond with the stored wireless device information contained in the memory.

2. The hands-free circuit of claim 1, wherein the memory further includes wireless device profile information of a wireless device to indicate that the wireless device includes remote voice tag information associated with remotely stored wireless device information, wherein the speech processor is operative to:
   receive the remote voice tag information as the received wireless device information when the received wireless device information does not correspond with the stored wireless device information contained in the memory and when the profile information in the memory indicates that the wireless device includes the remotely stored wireless device information corresponding to the received wireless device information; and
   produce audio information in response to the received remotely stored voice tag information.

3. The hands-free circuit of claim 1, wherein the received wireless device information includes in-band ring tone information, and wherein the speech processor is operative to:
   produce the in-band ring tone information as the audio information in response to the received in-band ring tone information.

4. The hands-free circuit of claim 1, wherein the received at least wireless device information includes at least one of: caller identification information, call processing information, ring tone information, link quality information, speech information, three-way calling information, voice mail information, battery level information, navigation information and wireless device status information.

5. A hands-free circuit comprising:
   a wireless local area network (WLAN) transceiver that receives at least wireless device information;
   memory including:
      voice tag information associated with stored wireless device information; and
      wireless device profile information of a wireless device to indicate that the wireless device includes remote voice tag information associated with remotely stored wireless device information;
   a speech processor, operatively coupled to the wireless local area network transceiver and to the memory, and operative to:
      receive the voice tag information associated with the stored wireless device information, and in response produce audio information corresponding to the voice tag information, when the received wireless device information corresponds with the stored wireless device information;
      receive the remote voice tag information as the received wireless device information, and in response produce the audio information corresponding to the remote voice tag information when the received wireless device information does not correspond with the stored wireless device information and when the wireless device profile information in the memory indicates that the wireless device includes the remotely stored wireless device information corresponding to the received wireless device information;
      speech synthesize the received wireless device information to produce the audio information when the received wireless device information does not correspond with the stored wireless device information contained in the memory;
      produce in-band ring tone information as the audio information when the received wireless device information corresponds to in-band ring tone information; and
      produce local ring tone information when the received wireless device information corresponds to ring tone information.

6. The hands-free circuit of claim 5, wherein the received at least wireless device information includes at least one of: caller identification information, call processing information, ring tone information, link quality information, speech information, three-way calling information, voice mail information, battery level information, navigation information and wireless device status information.

7. The hands-free circuit of claim 5, including:
   a microphone operative to produce a microphone signal;
   an analog-to-digital converter, operatively coupled to the microphone and to the speech processor, and operative to receive the microphone signal, and in response to provide microphone data to the speech processor;
   a digital-to-analog converter operative to receive the audio information, and in response to produce an audio signal;
   an amplifier, operatively coupled to the digital-to-analog converter, and operative to receive the audio signal, and in response to produce an amplified audio signal; and
   a speaker, operatively coupled to the amplifier, and operative to acoustically produce the amplified audio signal.

8. A communication apparatus, comprising:
   a housing having coupled therewith:

a speaker and microphone;
a hands-free circuit within the housing operatively coupled to the speaker and microphone and comprising:
a wireless local area network transceiver that receives at least wireless device information;
memory including voice tag information associated with stored wireless device information;
a speech processor, operatively coupled to the wireless local area network transceiver and to the memory, and operative to:
receive the voice tag information associated with the stored wireless device information and in response produce audio information corresponding to the voice tag information when the received wireless device information corresponds with the stored wireless device information contained in the memory; and
speech synthesize the received wireless device information to produce the audio information when the received wireless device information does not correspond with the stored wireless device information contained in the memory.

9. The communication apparatus of claim 8, wherein the memory further includes wireless device profile information of a wireless device to indicate that the wireless device includes remote voice tag information associated with remotely stored wireless device information, wherein the speech processor is operative to:
receive the remote voice tag information as the received wireless device information when the received wireless device information does not correspond with the stored wireless device information contained in the memory and when the wireless device profile information in the memory indicates that the wireless device includes the remotely stored wireless device information corresponding to the received wireless device information; and
produce audio information in response to the received remotely stored voice tag information.

10. The communication apparatus of claim 8, wherein the received wireless device information includes in-band ring tone information, and wherein the speech processor is operative to:
produce the in-band ring tone information as the audio information in response to the received in-band ring tone information.

11. The communication apparatus of claim 8, wherein the received at least wireless device information includes at least one of: caller identification information, call processing information, ring tone information, link quality information, speech information, three-way calling information, voice mail information, battery level information, navigation information and wireless device status information.

12. The communication apparatus of claim 8 wherein the housing further houses:
a microphone, operatively coupled to the speech processor, and operative to produce a microphone signal;
an analog-to-digital converter, operatively coupled to the microphone and to the speech processor, and operative to receive the microphone signal, and in response to provide microphone data to the speech processor;
a digital-to-analog converter operative to receive the audio information, and in response to produce an audio signal;
an amplifier, operatively coupled to the digital-to-analog converter, and operative to receive the audio signal, and in response to produce an amplified audio signal; and
a speaker, operatively coupled to the amplifier, and operative to acoustically produce the amplified audio signal.

13. The communication apparatus of claim 8, wherein the communication apparatus is included in at least one of a speaker phone and a telephone.

14. An in-vehicle communication system comprising:
a WLAN antenna;
a hands-free circuit comprising:
a wireless local area network transceiver, operatively coupled to the WLAN antenna that receives at least wireless device information;
memory including voice tag information associated with stored wireless device information;
a speech processor, operatively coupled to the wireless local area network transceiver and to the memory, and operative to:
receive the voice tag information associated with the stored wireless device information and in response produce audio information corresponding to the voice tag information when the received wireless device information corresponds with the stored wireless device information contained in the memory; and
speech synthesize the received wireless device information to produce the audio information when the received wireless device information does not correspond with the stored wireless device information contained in the memory;
an audio system including:
a tuner stage operative to receive a transmitted audio signal and in response to produce an audio signal;
an amplifier, operatively coupled to the tuner stage, and operative to receive the audio signal, and in response to produce an amplified audio signal; and
at least one speaker, operatively coupled to the amplifier, and operative to receive the amplified audio signal and in response to acoustically produce the amplified audio signal;
wherein the hands-free circuit includes:
a transmitter, operatively coupled to the speech processor, and operative to receive the audio information, and in response to produce the transmitted audio signal.

15. The in-vehicle communication system of claim 14, wherein the hands-free circuit includes:
a microphone, operatively coupled to the speech processor, and operative to produce a microphone signal;
an analog-to-digital converter, operatively coupled to the microphone and to the speech processor, and operative to receive the microphone signal, and in response to provide microphone data to the speech processor;
a digital-to-analog converter operative to receive the audio information, and in response to produce an audio signal;
an amplifier, operatively coupled to the digital-to-analog converter, and operative to receive the audio signal, and in response to produce an amplified audio signal; and
a speaker, operatively coupled to the amplifier, and operative to acoustically produce the amplified audio signal.

16. The in-vehicle communication system of claim 14, wherein the transceiver is at least one of: a wireless wide area network (WWAN) transceiver, a wireless local area network (WLAN) transceiver and a personal area network (PAN) transceiver.

17. The in-vehicle communication system of claim 14, wherein the memory further includes wireless device profile information of a wireless device to indicate that the wireless device includes remote voice tag information associated with remotely stored wireless device information, wherein the speech processor is operative to:
  receive the remote voice tag information as the received wireless device information when the received wireless device information does not correspond with the stored wireless device information contained in the memory and when the profile information in the memory indicates that the wireless device includes the remotely stored wireless device information corresponding to the received wireless device information; and
  produce audio information in response to the received remotely stored voice tag information.

18. The in-vehicle communication system of claim 14, wherein the speech processor is operative to receive in-band ring tone information, and in response produce the in-band ring tone information as the audio information.

19. A method for an in-vehicle communication system:
  receiving wireless device information from a wireless device within a vehicle;
  receiving voice tag information associated with stored wireless device information when the received wireless device information from the wireless device corresponds with the stored wireless device information contained in memory, and in response producing speech synthesized information;
  speech synthesizing the received wireless device information to produce the speech synthesized information when the received wireless device information does not correspond with the stored wireless device information contained in the memory; and
  outputting the speech synthesized information through a speaker in the vehicle.

20. The method of claim 19, further including:
  receiving wireless device profile information of a wireless device indicating that the wireless device includes remote voice tag information associated with remotely stored wireless device information;
  receiving the remote voice tag information as the received wireless device information when the received at least wireless device information does not correspond with the stored wireless device information contained in the memory and when the profile information in the memory indicates that the wireless device includes stored wireless device information corresponding to the received at least wireless device information; and
  producing speech synthesized information in response to the received remote voice tag information.

21. The method of claim 19, wherein the received wireless device information includes in-band ring tone information, the method further including:
  producing the in-band ring tone information as the audio information in response to the received in-band ring tone information.

* * * * *